United States Patent
Azimi et al.

(10) Patent No.: US 7,719,958 B1
(45) Date of Patent: May 18, 2010

(54) METHOD AND APPARATUS FOR ENABLING MULTICAST OVER SPLIT MULTILINK TRUNKING

(75) Inventors: Behfar Azimi, Los Gatos, CA (US); Wassim Tawbi, Mountain View, CA (US); Roger Lapuh, Uesslingen (CH); Avoy Nanda, Milpitas, CA (US); Ruchi Vats, Agra (IN)

(73) Assignee: Avaya, Inc., Basking Ridge, NJ (US)

( * ) Notice: Subject to any disclaimer, the term of this patent is extended or adjusted under 35 U.S.C. 154(b) by 891 days.

(21) Appl. No.: 11/238,714

(22) Filed: Sep. 29, 2005

Related U.S. Application Data

(60) Provisional application No. 60/614,105, filed on Sep. 29, 2004.

(51) Int. Cl.
*H04L 12/56* (2006.01)
(52) U.S. Cl. .................................... 370/220; 370/390
(58) Field of Classification Search ......... 370/216–218, 370/242, 244, 270, 390, 395.32, 432
See application file for complete search history.

(56) References Cited

U.S. PATENT DOCUMENTS

| | | | |
|---|---|---|---|
| 2001/0037472 A1* | 11/2001 | Li | 714/4 |
| 2002/0122390 A1* | 9/2002 | Garff et al. | 370/252 |
| 2002/0186694 A1* | 12/2002 | Mahajan et al. | 370/390 |
| 2003/0097470 A1* | 5/2003 | Lapuh et al. | 709/239 |
| 2003/0118170 A1* | 6/2003 | Wilson | 379/220.01 |
| 2005/0007951 A1 | 1/2005 | Lapuh et al. | |

OTHER PUBLICATIONS

Spirent Communications, *White Paper—Multicast Routing—PIM Sparse Mode and Other Protocols*, Nov. 2003.

* cited by examiner

*Primary Examiner*—Gregory B Sefcheck
*Assistant Examiner*—Yong Zhou
(74) *Attorney, Agent, or Firm*—Anderson Gorecki & Manaras LLP

(57) ABSTRACT

Multicast traffic may be routed using DVMRP or PIM over a Split MultiLink Trunk (SMLT). Network elements on the split side of the SMLT are interconnected by an Inter-Switch Trunk (IST) to enable them to exchange control messages associated with the multicast. When a control message is received on the IST, the network element will determine if the multicast control message is associated with a normal multicast or is associated with multicast over an SMLT link. Control messages related to SMLT links will be processed as if they were received over the SMLT link rather than the IST link. To prevent traffic from being forwarded by multiple network elements over the SMLT link, data traffic from an IST link may not be transmitted over an SMLT link. Flags are used to indicate whether a link is a SMLT link or regular link. Fast recovery may occur by causing participants to transmit triggered join messages upon recovery from a failure.

19 Claims, 5 Drawing Sheets

METHOD AND APPARATUS FOR ENABLING MULTICAST OVER SPLIT MULTILINK TRUNKING

CROSS-REFERENCE TO RELATED APPLICATIONS

This application claims priority to U.S. Patent Application No. 60/614,105, filed Sep. 29, 2004, entitled Multicast Over Split Multilink Trunking, the content of which is hereby incorporated herein by reference.

BACKGROUND

1. Field

This application relates to communication networks and, more particularly, to a method and apparatus for enabling multicast transmissions to occur over a split multilink trunk.

2. Description of the Related Art

Data communication networks may include various computers, servers, hubs, switches, nodes, routers, proxies, and other devices coupled to and configured to pass data to one another. These devices will be referred to herein as "network elements". Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

FIG. 1 illustrates one example of a communication network 10. As illustrated in FIG. 1, subscribers 12 access the network 10 by interfacing with one or more Provider Edge (PE) network elements 14. The provider edge network elements collect traffic from multiple subscribers and multiplex the traffic onto the network backbone, which includes multiple Provider (P) network elements 16 connected together. The subscribers 12 thus may obtain access to the network 10 to exchange data with other subscribers, to obtain access to networked resources, or otherwise to take advantage of the communication services provided by the communication network.

One way to make networks more reliable is to provide redundant connections at the network level. For example, a connection at the edge of the network between a subscriber and PE network element, or between PE and P network elements may be created from multiple links that are configured to interconnect one or more subscriber gateways to one or more provider edges. To facilitate management, although physically the links are separate, logically they may be viewed as a single trunk so that a failure of one of the links forming the trunk will not require the network element to take any corrective action. Rather, the network is able to accommodate the failure by causing traffic to be shifted to the other link(s) forming the multi-link trunk. One example of multi-link trunking is provided in U.S. patent application Ser. No. 10/125,654, filed Apr. 19, 2002, entitled System, Device, and Method For Improving Communication Using Trunk Splitting, the content of which is hereby incorporated herein by reference. Similarly, a way of implementing routing on a split multilink trunking system is provided in U.S. patent Ser. No. 10/618,136, filed Jul. 11, 2003, entitled Routed Split Multilink Trunking, the content of which is hereby incorporated by reference.

Traffic on a communication network may be classified according to how it is addressed. For example, broadcast traffic is addressed to all recipients, unicast traffic is addressed to a particular recipient, and multicast traffic is addressed to a plurality of recipients. Depending on the particular application and type of traffic, it may make sense to multicast the traffic rather than unicasting the traffic to multiple recipients.

Many multicasting protocols have been developed to allow traffic to be multicast on a communication network. Two such multicast protocols that have gained some acceptance in the networking industry include Protocol Independent Multicast (PIM) and Distance Vector Multicast Routing Protocol (DVMRP), although other protocols are also being discussed and implemented. Since multicast transmissions are expected to increase as networks continue to develop, it would be advantageous to allow multicast protocols to operate in a split multilink trunking environment. Additionally, it would be advantageous to enable sub-second recovery to occur upon failure, to provide layer 3 protocols at the edge of the SMLT, and to provide support for square SMLT.

SUMMARY OF THE DISCLOSURE

The use of multicast protocols to enable multicast transmissions may occur over a Split MultiLink Trunk (SMLT). Protocols supported include DVMRP and PIM, as well as other multicast protocols. According to an embodiment of the invention, the network elements on the split side of the SMLT are interconnected by an Inter-Switch Trunk (IST) to enable them to exchange control messages associated with the multicast. When a control message is received on the IST, the network element will perform a lookup operation to determine if the source MAC address for the multicast control message is associated with the IST port or a SMLT port. Where the control message relates to a SMLT port, the network element will process the control message as if it were received over the SMLT port rather than the IST port. A source MAC address lookup may be used to determine whether the source address of the network element issuing the multicast control message is associated with a SMLT port.

To prevent traffic from being forwarded by multiple network elements associated with the SMLT link and forming a network loop, the network elements are prevented from forwarding data traffic over an SMLT link that was received over the IST link. Upon failure of one of the network elements forming the split side of the SMLT, SMLT flags are removed on the other SMLT network element to enable that network element to forward traffic as if the SMLT didn't exist. Fast recovery may be effected by causing the participants to transmit triggered join messages upon recovery from a failure on the network.

Those skilled in the art will appreciate the scope of the present invention and realize additional aspects thereof after reading the following detailed description of the preferred embodiments in association with the accompanying figures.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

According to an embodiment of the invention, inter-switch trunks (ISTs) are used to exchange multicast information between network elements forming a SMLT to ensure that multicast data is able to be delivered over the SMLT links. In this manner, IP multicast routing may be configured using DVMRP or PIM at the edge, in a triangular, square, or meshed configuration, to provide the flexibility in network designs when offering an SMLT solution. In the following description, an initial protocol independent solution will first be described and then two example embodiments will be provided, one of which focuses on a DVMRP implementation and the other of which focuses on a PIM implementation.

Figure 1:
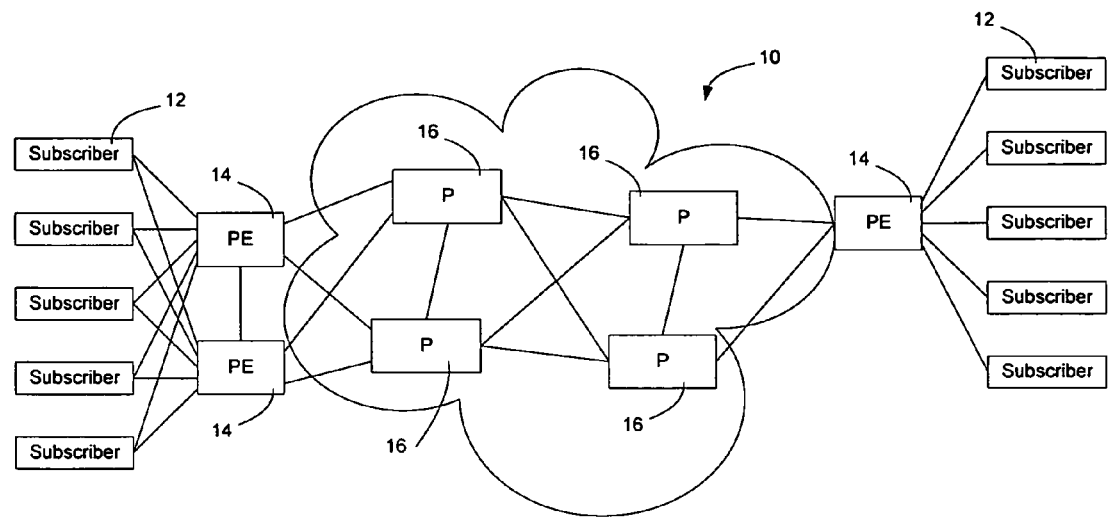
FIG. 1 is a functional block diagram of an example network in which multicast over split multilink trunking may be implemented according to an embodiment of the invention.
Figure 2:
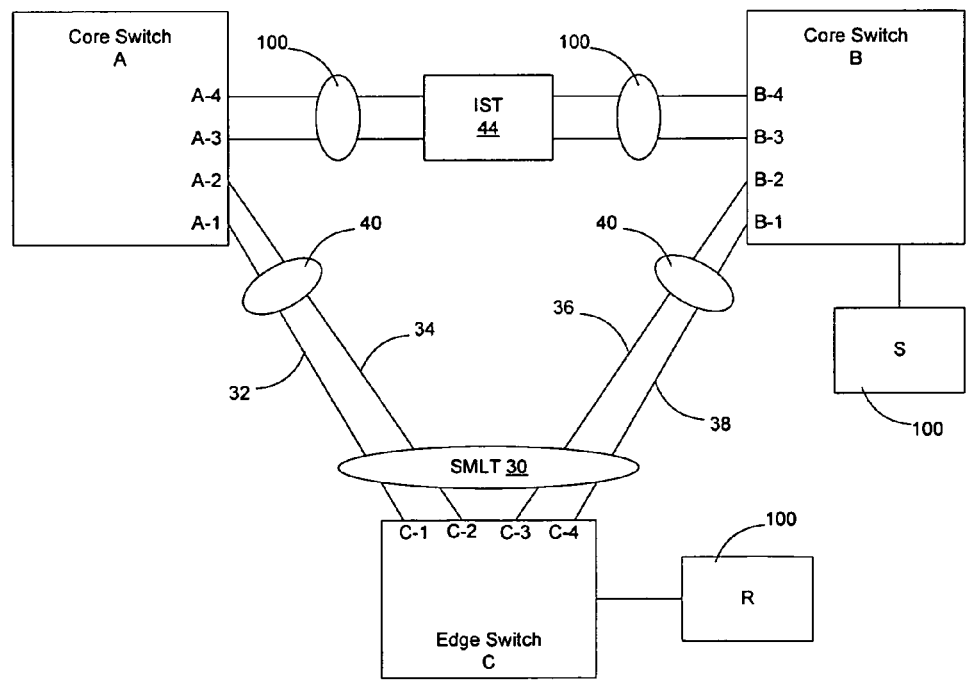
FIGS. 2-6 are functional block diagrams of portions of the example network of FIG. 1 in which a triangular SMLT has been created according to an embodiment of the invention.

FIG. 2 illustrates an example of a network topology in which a plurality of core switches are connected to an edge switch such using split multilink trunking (SMLT). The core switches may be P or PE network elements, while the edge switch may be a PE or subscriber gateway network element. The invention is not limited to this particular example as multicast support over SMLT may occur at other places on the network as well.

In the example shown in FIG. 2, a split multilink trunk 30 includes a plurality of physical links 32-38 interconnecting two sets of network elements—core switches A, B, and edge switch C. In the illustrated embodiment, a multilink trunk 40 including physical links 32 and 34 interconnects edge switch C with core switch A, and a second multilink trunk 42 including physical links 36 and 38 interconnects edge switch C with core switch B. Collectively, the links 32-38 form a split multilink trunk (SMLT) 30.

The SMLT 30 may be treated by the edge switch C as a single trunk, which allows the edge switch C to be insulated from the manner in which the physical links are connected to the core network elements. Additionally, treating the combination of links 32-38 as a single logical trunk isolates the edge switch from experiencing trunk failure on a given link when one of the links 32-38 goes down. This stabilizes the routing since the edge switch will not attempt to route around the problem when one of the links forming the trunk goes down.

The network elements A and B work together to enable network element C to treat the amalgamation of the links forming SMLT 30 as a single logical trunk. Thus, the split multilink trunk allows multiple physical links to be split between two or more network elements to increase redundancy at the network level. In the illustrated example there are two links in each of the MLTs. The invention is not limited in this manner as a single physical link or multiple physical links may be used to form each of the MLTs. Similarly, more than two core switches may be used to home the physical links.

In the illustrated embodiment, an Inter-Switch Trunk (IST) 44 is used to connect core switch A with core switch B. The IST is used to allow the core switches to exchange information with each other so that the two peer core switches may build identical views of the edge switch C.

To provide IP multicast routing support over a SMLT, it is necessary to build a virtual switch that represents the two switches of the SMLT core. To do this, the SMLT protocol in use on core switches A and B may be enhanced to enable multicast messages to be exchanged between these core switches. The exchange of messages will allow the core switches to have a common view from a multicast routing perspective, so that either of the core switches may provide multicast support in the event of a failure on the network.

Whether the switches are running DVMRP or PIM, they will need to exchange protocol related updates as part of the IST protocol, that will result in hiding the fact the edge switch is attached to two physical switches. Similar to the Group Learning Protocol (GLP), a protocol, called Multicast Routing Learning Protocol (MRLP) is implemented as an extension to SMLT to support routed scenarios. The specific types of messages that may be used to implement a DVMRP embodiment and a PIM-based embodiment are discussed in greater detail below.

In operation, the edge switch C and other network elements on the network will transmit control messages, such as forwarder messages, multicast tree building information, and other messages specified by the selected multicast protocol (collectively control messages), to one of the core switches A, B. Generally, the control messages from the edge switch C would be expected to be transmitted by the edge switch C to one of the core switches A, B, over a selected one of the links 32-38 that form the SMLT. Upon receipt of a control message, the core switch will journal the control message to the peer core switch supporting the SMLT to allow one view of the edge switch to be built in the two core switches. For example, if edge switch C were to forward a multicast control message over link 32, core switch A would process the message and transmit the control message over IST 44 to core switch B to allow core switch B to update its database with the same data.

The MRLP protocol may be implemented as an extension to the existing SMLT implementation. For example, DVMRP messages may be encapsulated into Inter-Switch Trunking (IST) IST messages with proper identification to indicate that these messages are part of the MRLP protocol. Other ways of implementing this and additional details associated with implementing MRLP as an extension to SMLT are set forth below.

Figure 7:
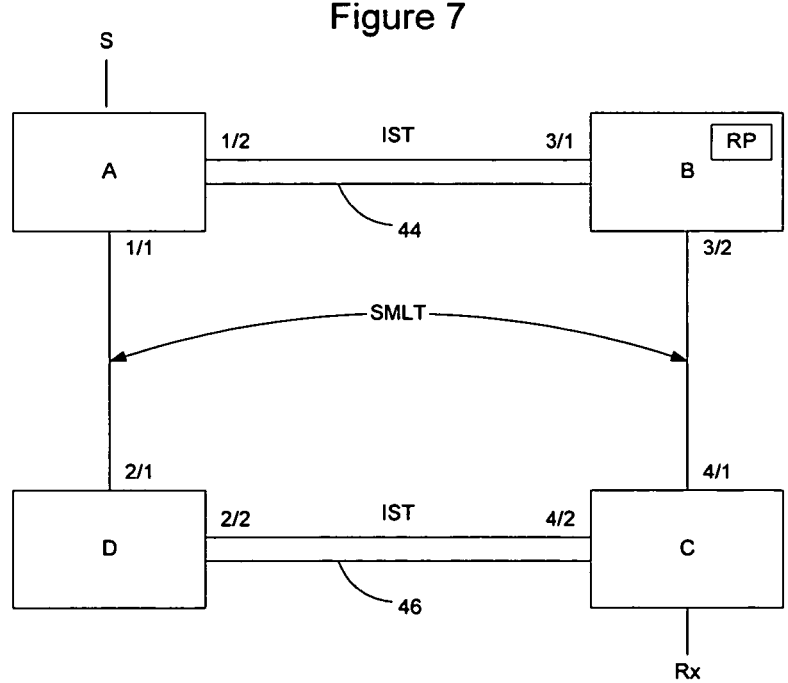
FIG. 7 is a functional block diagram of an example of a portion of the example network of FIG. 1 in which a square SMLT has been created according to an embodiment of the invention.
Figure 8:
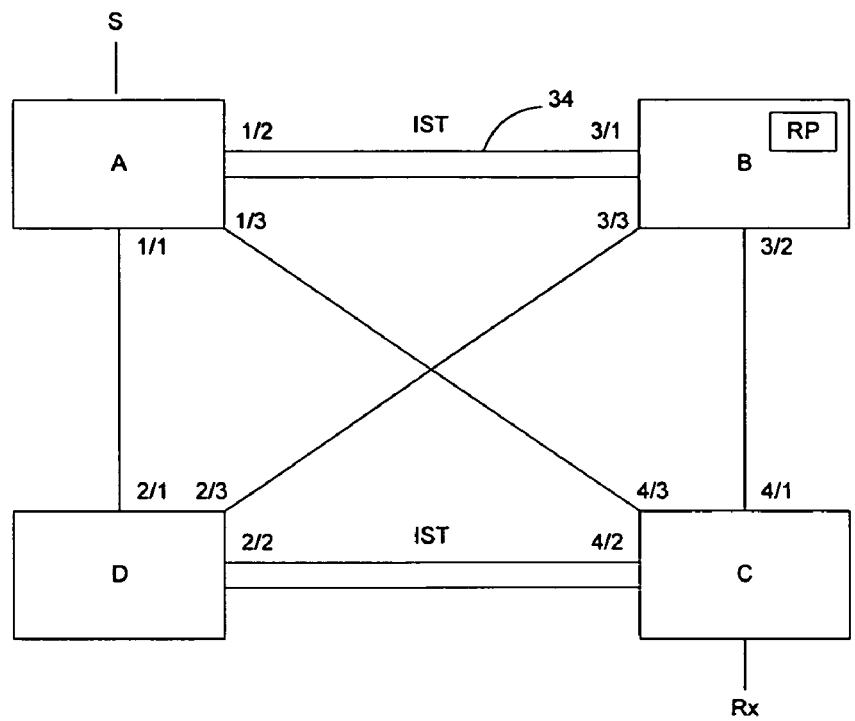
FIG. 8 is a functional block diagram of an example of a portion of the example network of FIG. 1 in which a square meshed SMLT has been created according to an embodiment of the invention.

The proposed solution and the MRLP protocol may be used in connection with any layer 3 IP multicast configuration. For example, the SMLT network configuration may be implemented as a triangle (as illustrated in FIGS. 2-6) as a square (as illustrated in FIG. 7) or as a full mesh (as illustrated in FIG. 8). Other SMLT configurations may be possible as well and the invention is not limited to a particular network configuration.

An InterSwitch Trunk (IST) is formed between the networks homing the multiple links of the SMLT. The IST allows the switches to exchange data and control messages. To prevent a routing loop from being formed, and to prevent data traffic from being forwarded to the edge switch by both core switches, certain rules apply. For example, a core switch for a given VLAN will not forward data traffic over a SMLT link if that traffic was received from the IST link. This prevents traffic from being transmitted from both core switches on the SMLT links to the edge switch. Thus, since data traffic can't be forwarded from the IST to a SMLT, any implementation should take the rule into account when implementing the particular multicast routing protocol.

Although traffic received on an IST port is not allowed to be transmitted over an SMLT link for the same VLAN, the prohibition does not apply to SMLT links associated with different VLANs. Accordingly, it is possible for traffic that is received on an IST port to be routed to another VLAN on the SMLT switch. Thus, the IST can be used as a way to route traffic between VLANs if the forwarding decision for the multicast protocol requires the other side of the core to forward the multicast traffic (follow the IP multicast routing and forwarding rules for routed traffic).

DVMRP and SMLT

Distance Vector Multicast Routing Protocol (DVMRP) operates by flooding data onto the network and then pruning away unused branches to end up with an efficient multicast tree. Other multicast protocols such as Protocol Independent Multicast-Dense Mode (PIM-DM) operate in this manner as well. For convenience, only DVMRP will be discussed in this section. The invention is not limited to the use of DVMRP as other protocols that behave similarly may be used in connection with the embodiment described below.

In DVMRP, when a sender initially starts sending data, the data is forwarded to all of the nodes on the network so that the data is allowed to reach the edges of the network. When a router receives the data, it makes a decision as to whether it has any dependent nodes or directly connected receivers. If it has any dependent nodes, or directly connected receivers, it will forward the data. If not, it will prune itself from the tree by sending a prune message upstream toward the source. When an intermediate node receives a prune message, it will remove that node from further transmissions. In this manner, nodes may be pruned from the tree, so that the resultant tree is formed of nodes that have at least one downstream receiver. W When a node that initially has a dependent node receives a prune message, it will stop sending data toward that node. When all dependent nodes and directly connected receivers have pruned themselves from the tree, the node may prune itself from the tree as well. When there are two paths from a node to a given receiver, the shortest path will be used and the other path will be blocked. When a node is to join a tree, it will use a GRAFT message to add itself to the tree. DVMRP is well known in the art and a detailed description of how it functions will therefore be omitted.

To allow DVMRP to be supported over a split multilink trunk, the core switches terminating the trunks need to have the same view of the edge switch(es) for each VLAN. One way to do this is cause the core switches implementing the SMLT to exchange all DVMRP messages associated with a VLAN between each other. Thus, in FIG. 2, if core switch A receives a multicast control message from C, it will forward the control message to peer core switch B. This allows A and B to build the same view of edge switch C so that multicast routing can be supported over the SMLT 30.

Note that it is not required that Multicast Border Router (MBR) is supported as part of the SMLT VLANs themselves, but can be used separately in the same routed network if needed. Hence, no specific provisions are required for MBR and SMLT.

In the embodiment shown in FIG. 2, assume that switch B learns of neighbors A and C through the InterSwitch Trunk (IST 44). If sender S and receiver R are in different VLANs than that of the SMLT, traffic from S to R will follow path S→B→A→C→R. However, as noted above, traffic within a VLAN cannot be switched from the IST 34 to the SMLT 30. Thus, a core switch should be configured such that routes learned from an edge switch over a SMLT link should be associated by the peer core switch over its SMLT link to the edge as well.

For DVMRP, any route learned from the edge switch should be propagated to the core switches and, hence, the switch receiving this information should forward it to the other core switch using MRLP.

Since in an SMLT configuration, an edge switch always assumes that it is connected to one switch through a multilink trunk, anything learned by one of the core switches is provided to the other core switch, so that the core switches may be formed to be mirror copies of each other. For example, any (Route/MAC, etc) learned on an SMLT port on switch A (e.g. port A-1 or A-2 in FIG. 2) will also need to be learned on SMLT port on switch B (e.g. port B-1 or B-2 in FIG. 2). In operation, if core switch A learns a route on SMLT port A-2, it will forward the route on IST port A3 or A-4 to core switch B. Rather than learn the route on IST port B-3 or B-4, however, core switch B will recognize that the route relates to an SMLT link and, accordingly, will remap the route to one of the ports assigned to the SMLT (in this example port B-1 or B-2). Similar behavior may occur with respect to multicast messages such as DVMRP control messages exchanged between the core switches, so that DVMRP may be run on the edge switch.

The core switches may synchronize many different DVMRP messages with each other to allow a consistent view of the edge switch to be built in each of the core switches. For example, DVMRP messages including PROBE, ROUTE REPORT, PRUNE, GRAFT, and GRAFT ACK, may be shared between the core switches to allow the core switches to be synchronized. Since a similar view may be built in each of the core switches, the core switches will respond similarly as traffic is received to selectively forward or not forward traffic depending on whether the edge switch C is a member of the multicast tree.

In DVMRP, the PROBE and ROUTE REPORT messages are sent to the reserved multicast address of 224.0.0.4. Since the edge switch and the peer IST switches are all part of the same VLAN, both of the core switches A and B should receive these messages. However, since the edge switch C will only send these messages to one of the core switches (on one of the trunks making up the SMLT 30), the core switch on which the active port resides will receive the control message from C and will pass it over the IST link 34 to the other peer core switch. For example, if the edge switch C transmits the DVMRP messages over port C-3, core switch B will receive the messages on port B-2 and will forward the messages over the IST 44, i.e. over either port B-3 or B-4.

When the peer core switch receives the DVMRP message, it will process the message as if the message had been learned on the SMLT port, not on the port assigned to the IST trunk. Thus, in this example, if the core switch A receives a DVMRP message over IST port A-3, it will process the message as if it had been received over either of its SMLT ports A-1 or A-2 which are assigned to the SMLT. Thus, the peer core switch will apply the messages received over the IST for a particular VLAN to the port(s) associated with that VLAN.

The PROBE and ROUTE REPORT messages may be handled in a similar manner. Specifically, if a PROBE or ROUTE REPORT message is received over the IST, it will be treated by the peer core switch as if it had been received on the SMLT port. Thus, for example, if core switch B receives a PROBE or ROUTE REPORT message over port B-1, it will forward the message over the IST 44 via port B-3 to core switch A. The core switch A, upon receipt of the PROBE or ROUTE REPORT message on port A-3 will determine which SMLT the message relates to, and will then treat the message as if it had received it over the port assigned to that SMLT (port A-1 or A-2 in this example). Thus, either switch can send data directly to switch C through its SMLT port towards switch C.

One way to allow DVMRP messages received over the IST to be associated with the proper SMLT is to perform a source MAC address search on the control packets received on the IST. Specifically, the core switches will look at the source MAC of control messages received over the IST 44. If the source MAC associated with the control message indicates that an edge switch associated with the SMLT was the source of the message, and if the message was received over the IST 44, then the core switch will process the control message as if it had been received over one of the ports assigned to that SMLT. In the example shown in FIG. 2, upon receipt of a control message on IST port B-3, core switch B will perform a source address (SA) search to see if the SA is associated with any SMLT. Since, in this example, the SA of the edge switch will be known to core switch B, core switch B may associate the control packets with the SMLT 30 and process the control packet as if it had been received over port B-1 or B-2.

PRUNE, GRAFT and GRAFT ACK messages in the DVMRP protocol are sent as unicast messages to the upstream router. Since the traffic on the multicast tree will naturally be directed to one of the core switches, it is not necessary to synchronize these messages between the core switches. Specifically, since the tree will extend through either core switch A or core switch B, that core switch may prune itself from the multicast tree or add itself to the multicast tree without involving the peer core switch. Since the messages are unicast and sent directly to the upstream router, they need not be synchronized. Additionally, it may be preferable for both core switches see the source route through the same path. If the PRUNE and GRAFT messages were to be journaled between the peer core switches, both peer core switches may establish a path to the source route which may be disadvantageous in certain circumstances. Thus, the PRUNE and GRAFT messages are not required to be synchronized between the core switches.

As an illustration, assume that there is a source network above core switches A and B in FIG. 2 (dashed lines in FIG. 2). If, for example, the source route is through core switch A, core switch B will see core switch A as being above it in the multicast tree—core switch B will see core switch A as its upstream router. If edge switch C sends a PRUNE message to switch A, the prune message need not be synchronized with switch B since switch B sees switch A as its upstream switch. If the PRUNE message were to be synchronized from core switch A to core switch B, core switch B would process the message and send a PRUNE message to its upstream switch which, in this instance, is switch A. Thus, synchronizing PRUNE messages between the core switches is unnecessary.

A similar result occurs if the PRUNE message is received by core switch B. Specifically, core switch B will notify its upstream router, which in this example is core switch A. Requiring core switch B to also synchronize receipt of the PRUNE message with core switch A is therefore redundant. The same rule applies to GRAFT messages.

According to an embodiment of the invention, upon receipt of a DVMRP control message over a port assigned to an IST link, the core switch will derive the SMLT port corresponding to the control message from the Smlt_id and Vlan_id fields which are normally included to identify the packets transmitted between the core switches on the IST. The core switch will then call the corresponding DVMRP function, substituting the derived SMLT port for the IST port. The following table TABLE I sets forth the functions for processing the expected DVMRP control messages.

TABLE I

| Message Type | Function |
| --- | --- |
| Probe | accept_probe(src, dst, msg, len, level, pport): Not required, but special processing is required* |
| Route report | accept_report(src, dst, msg, len, level, pport). Not required, but special processing is required |
| Prune | accept_prune(src, dst, msg, len, pport) |
| Graft | accept_graft(src, dst, msg, len, level, pport) |
| Graft ack | accept_g_ack(src, dst, msg, len, level, pport) |

As noted in TABLE I, for the PROBE and ROUTE REPORT control messages, the function is not required but special processing is required. Special processing, in this context, means that these messages should be processed as if they were received on the corresponding SMLT port. One way of determining if a control message is associated with an SMLT is to perform a MAC lookup as described above. If the MAC is initially unknown, then the PROBE message results in a regular DVMRP learning. If after this learning the PROBE message indicates that the MAC address of the sender switch is now on an SMLT, then the neighbor will be moved to the SMLT link corresponding to that MAC address. Additionally, it is important that the CPU not loop any of the control messages through the SMLT links.

When a port goes down, it is necessary to clean up the neighbor table, the route and next hop tables, and the group tables. For example, if the port is assigned to a multilink trunk and there are other active ports, then the neighbor table will be deleted. If there are no other active ports, the neighbor will be deleted. In the route and next-hop tables, upon deleting a neighbor, the corresponding route received from that neighbor will be aged out. In the group table, and hence the IP multicast layer, the group table and IPMC tables will need to be cleaned up to take into account the loss of the port and possibly the neighbor.

A goal of implementing a SMLT between the core switches and the edge switch is to minimize the impact of a failure of one of the core routers on traffic being transmitted over the SMLT. Thus, when a SMLT port goes down, and traffic ingresses the core switch and protocol derives that a down SMLT port is one of the egress interfaces, then no PRUNE should be sent under any circumstance. This will lead to a state where traffic from same source may ingress both core switches through different paths even though one of the core switches might discard at the port level. When peer-SMLT goes down, the discard record will be modified to a forwarding record and traffic flow will resume.

Figure 3:
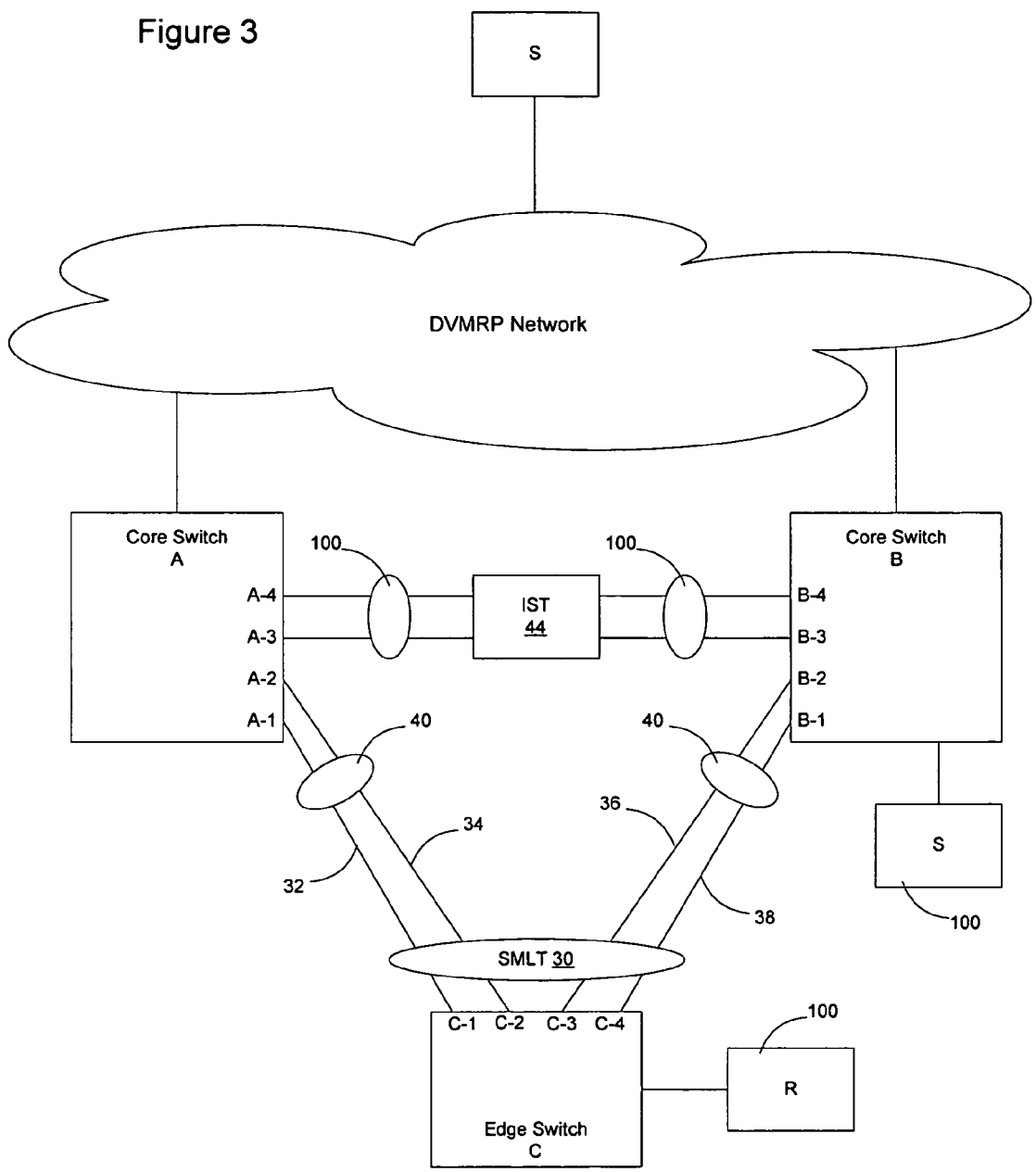

If a multicast source network is learned through non-IST interfaces by both of the SMLT switches, then traffic will remain live on both the switches, although only one of them will forward that traffic to an edge switch. FIG. 3 illustrates one example of where a source network is learned by both core switches through a non-IST interface. Specifically, as shown in FIG. 3, if both core switches A and B have their Reverse Path Forwarding (RPF) port towards S through a non-IST interface, then traffic ingressing these ports will, under normal circumstances, be forwarded by both switches to C. To prevent duplicative traffic from being received at receiver R, an election between the two core switches may be performed to selectively cause one of the core switches to drop the traffic at the port level.

In this instance, one of the core switches may be selected to forward the traffic on its SMLT port when the ingress port is not an IST port. For example, during a DVMRP route update, if the core switch A receives a route from the core switch B over the IST trunk 44, and the core switch B is not dependent on core switch A to reach the network, a comparison may be made to determine whether core switch A or core switch B should forward the traffic. One possible comparison that may be used to make this determination is to look at the IP addresses of the SMLT interfaces on core switch A and core switch B and to select the one with the highest value. Depending on the protocol, the control switch with higher IP address may be selected to transmit the traffic (PIM), although in DVMRP the lower IP address may be selected. Once an election is made, the core switch losing the election may set a flag (e.g. in the route record) to prevent multicast data received from the network from being forwarded onto the SMLT port(s). If the other core switch subsequently experiences failure, the flag may be reset to allow the core switch to resume normal processing of the multicast data, to thereby affect fast failover of traffic on the multicast tree.

The following PSEUDO-CODE may be used to prevent duplicate traffic from being forwarded to the edge switch by both core switches connected to the SMLT links. The invention is not limited to an embodiment that implements this pseudo-code as other processes may be used as well.

---
PSEUDO-CODE
---
MCAST traffic received on non-IST port and SMLT interface is in egress list &&
   If SMLT interface IP address is highest among all neighbors &&
      If IST interface is subordinate on source route {
         Add SMLT interface to egress list;
      }
      Else {
         Do not add SMLT interface to egress list; /* let peer-IST to forward traffic to edge switch */
      }
Do same algorithm when peer-SMLT comes UP.
On peer-SMLT Down trigger —
If SMLT interface is on egress list {
   Do nothing;
}
Else {
   Add SMLT inter face to egress list;
}
---

Where one of the core switches learns of the source network through a non-IST port, and the other learns of the source network through the other core switch via the IST port, the switch that receives the multicast traffic on the non-IST port will forward the traffic to the edge switch. Thus, for example in the example illustrated in FIG. 2, if core switch A learned of the source network through a non-IST port, and core switch B learned of the source network via IST port B-3, core switch A would be elected to forward the traffic to edge switch C.

The way in which failure will be handled may vary depending on how the source network is learned by the core switch. TABLE II illustrates some of the ways in which this may be handled. The invention is not limited to handling of failures in the manner outlined in this table.

TABLE II

| Status Change | Action |
| --- | --- |
| Case I - SMLT peer DOWN | Trigger - SMLT_PEER_DOWN<br>Action 1 - If not forwarding traffic to SMLT edge then add SMLT port to pep stream.<br>Action 2 - If not forwarding traffic to SMLT edge then add SMLT port to pep stream |
| Case II - SMLT peer UP | Trigger - SMLT_PEER_UP<br>Action 1 - Update neighbor IST about the neighbors learned on SMLT so that peer IST will learn these neighbors on SMLT port and start forwarding traffic if logic allows.<br>Action 2 - Stop forwarding traffic to SMLT if traffic is ingressing through IST |
| Case III - IST peer switch DOWN | Trigger - IST_DOWN<br>Action 1 - If not forwarding traffic to SMLT edge then add SMLT port to pep stream<br>Action 2 - If traffic is ingressing through IST then wait for DVMRP route update to happen other wise if not forwarding traffic to SMLT edge then add SMLT port to pep stream |
| Case IV - IST peer switch UP | Trigger - IST-UP<br>Action - If new route to source is learned through IST then stop forwarding to SMLT, otherwise if neighbor on IST peer is not dependent on core switch to reach source network then stop forwarding to SMLT if local address on IST is greater than the neighbor address on IST peer |

Although particular actions have been described to be taken when implementing DVMRP on SMLT, other features may be added as well and the invention is not limited to an embodiment that implements only these particular disclosed functions.

Protocol Independent Multicast (PIM)

Another multicast routing protocol, Protocol Independent Multicast (PIM)-Sparse Mode (PIM-SM), operates in a somewhat different manner than DVMRP and, accordingly, the manner in which the control packets are handled by the core switches may differ as well. Similarly, the manner in which data is handled by the core switches may differ depending on the manner in which the core switches are connected to the source network. Additional details as to how PIM-SM may be implemented over SMLT will now be provided in connection with FIGS. 4-9.

PIM is referred to as "protocol independent" since it will operate regardless of the underlying unicast routing protocol that was used to generate routes on the network. There are several versions of PIM, including PIM-Dense Mode and PIM-Sparse Mode (PIM-DM and PIM-SM respectively) and the invention may operate in connection with either of these versions. Since PIM-DM forms trees using a broadcast and prune method similar to that described above in connection with DVMRP, additional discussion of PIM-DM will not be provided at this time. The particular manner in which PIM operates is described in greater detail in IETF RFC 2362 (PIM-SM) and 3973 (PIM-DM), the content of each of which is hereby incorporated by reference.

In the PIM-SM version of the protocol, one router in a network will be designated as a Rendezvous Point (RP) which will form the root of a rendezvous point tree. The RP will broadcast messages to all Last Hop Routers (LHRs) indicating the location of the RP so that the LHRs can join multicast trees as needed. To join a multicast, a receiver will send an Internet Group Messaging Protocol (IGMP) join message to its designated router. The Designated Router (DR) sends a PIM-SM join message to the RP. The RP adds the DR to the rendezvous point tree so that the DR will be able to receive future transmissions over the multicast tree.

When a sender seeks to send data over a multicast tree, the source sends data to its first hop router (FHR). The FHR sends a unicast register-encapsulated data to the RP, which sends the data to all the LHRs on the RPT and adds the FHR to the rendezvous point tree. The RP will then send a PIM JOIN message to the FHR and the FHR will then be able to send multicast data along the rendezvous point tree. Optionally, where the members of the multicast tree determine that there is a shorter path between the source and the receiver, the LHR may send a JOIN message directly to the FHR to set up a shortest path tree independent of the rendezvous point tree. Once the shortest path tree is established, the LHR will prune itself from the rendezvous point tree by issuing a PRUNE message. In this manner a tree independent of the rendezvous point tree may be set up directly from the senders to the receivers.

Since PIM-SM relies on an underlying routing database to contain the unicast routes that will be used to transmit the packets, the routing databases of the core switches will need to be synchronized. Specifically, to allow PIM-SM multicast routing to occur in a network in which two or more core switches are connected to an edge switch over a SMLT 30, the core switches A, B, will need to be synchronized regarding the unicast routes used for PIM. Hence an implementation should ensure that whatever unicast routing protocol is used, routes are similar on both switches so that no loops or data interruption occurs.

In addition to synchronization of the routing database, PIM-SM messages will also need to be exchanged between the core switches to allow them to synchronize the way in which the PIM specific actions occur. For example, JOIN, JOIN-PRUNE, ASSERT, and BOOTSTRAP messages that are received from the edge switch C will need to be synchronized by the core switches A and B. Synchronization may occur using MRLP using the IST protocol.

The JOIN, JOIN-PRUNE, ASSERT, and BOOTSTRAP messages are conventionally sent to address: PIM_ALL_ROUTERS (IP address 224.0.0.13), hence they will be received by both the core switches A, B due to flooding on same VLAN. When a core switch receives any of these messages on an IST port, the core switch will get the source MAC address from the L2 header and derive the SMLT port from the source MAC address. If the source MAC address has not yet been learned, then the MAC address will be associated with the IST port. If it has been learned, the core switch will determine the SMLT associated with the SA and process the control packet as if it were received over the SMLT port. Once the appropriate port has been determined (either the derived SMLT port or the IST port), the message will be processed according to the PIM protocol with the ingress port set to either the derived SMLT port or the IST port.

When a HELLO message is received on an IST port from a source MAC address which was learned on an SMLT port, the neighbor port will be assigned as the SMLT port (not IST port). Similarly, upon receiving a JOIN-PRUNE message on an IST port, if there is a need to update the source-group entries, such as (*,G) or (S,G), or the rendezvous point entry (*,*,RP), then these entries will be associated with the SMLT port, not the IST port.

When one of the core switches experiences a failure, the other core switch should be able to assume responsibility for forwarding traffic to the edge switch from the multicast. The following TABLE III illustrates several scenarios in which failure may occur and the resultant action to be taken.

TABLE III

| Status Change | Action |
| --- | --- |
| SMLT peer DOWN | Trigger - SMLT_PEER_DOWN<br>Action - Reset NBF_SMLT flag on all neighbors learned on this SMLT<br>Triggered join/prune message is sent.<br>If the RPF port was pointing to SMLT port it is changed to IST port which will prevent the SG entries from getting deleted. The IST port is removed from the oif list |
| SMLT peer UP | Trigger - SMLT_PEER_UP<br>Action - Send HELLO message with reserve bit set so that edge router will send triggered JOIN-PRUNE message. This JOIN-PRUNE message will synchronize the PIM multicast route (MRT) entry database across IST.<br>Triggered Join/Prune messages are sent<br>The neighbor's are again flagged as NBF_SMLT as the hello messages are exchanged |
| SMLT local DOWN<br>IST peer switch DOWN | Trigger - SMLT_LOCAL_DOWN<br>Trigger - IST_DOWN<br>Action - Triggered Join/Prune messages are sent<br>Reset NBF_SMLT flag on all neighbors learned on the concerned SMLT |
| IST peer switch UP | Trigger - IST-UP<br>Action - For above 3 cases, reset NBF_SMLT flag for all the neighbors learnt on this SMLT and send out RP and BSR information on the IST.<br>On the IST switch which comes up a temporary default route is created<br>HELLO message is sent out with reserved bit set<br>Triggered joins are sent few times once Hello message is recieved with reserved bit set |

Several failure scenarios will now be discussed in connection with FIGS. 4-8. These failure scenarios are intended to illustrate operation of the invention in particular contexts and, as such, are not intended to limit application of the invention but rather illustrate several ways in which it may be employed. Accordingly, the invention is not limited to operation in these particular examples.

Figure 4:
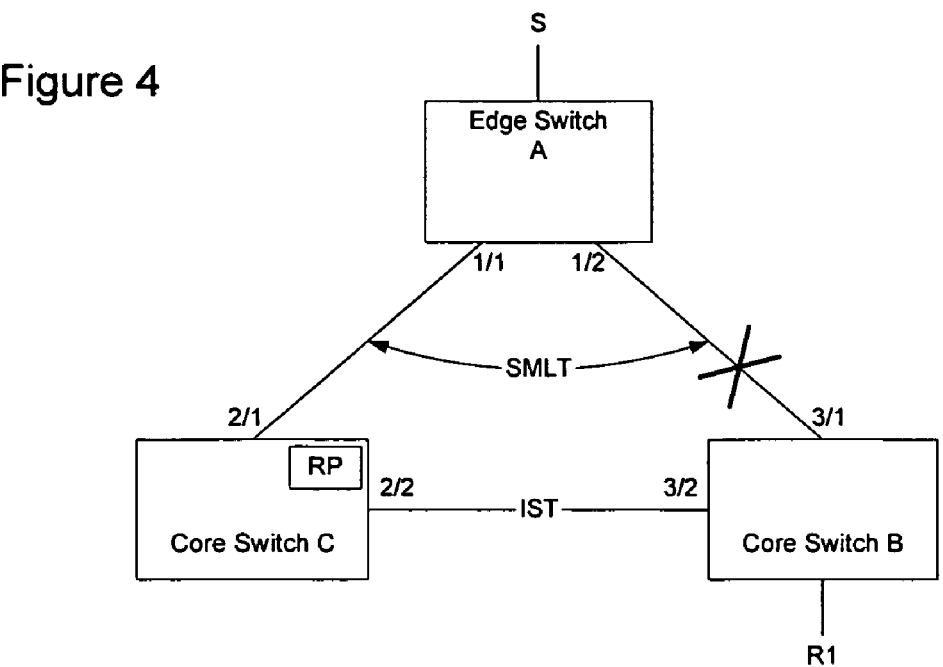
Figure 5:
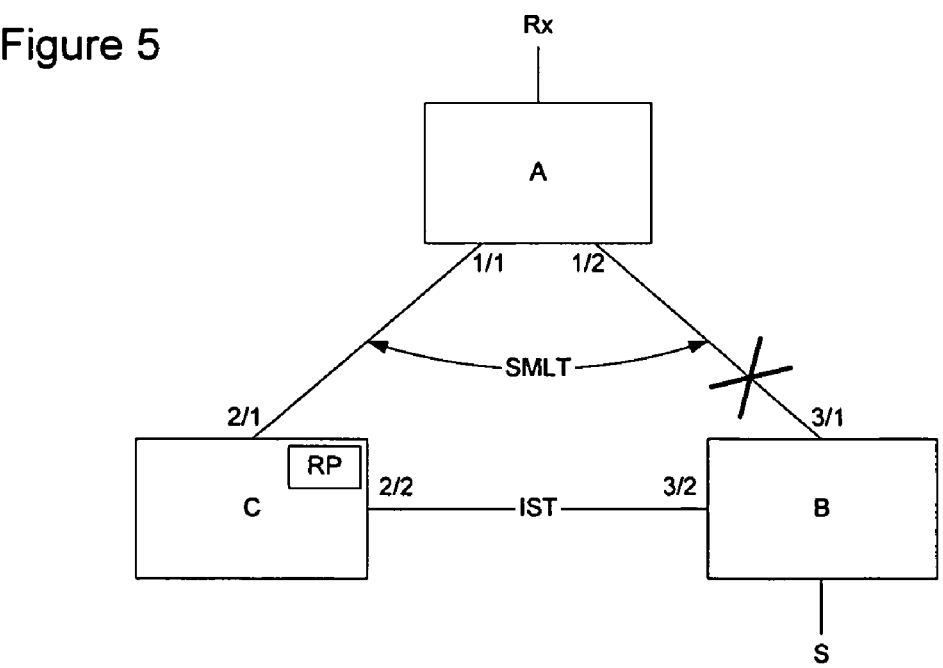

FIG. 4 illustrates a triangular SMLT architecture in which an edge switch A is connected via a SMLT to two core switches B and C. The edge switch A, in this example, is connected to a source network represented by letter S. To allow other network elements, such as receiver R1 to join a multicast tree to receive content from sender S, the receivers will send JOIN messages toward A. If the link between edge switch A and core switch B goes down, JOIN messages sent to A will need to be sent to C before they reach A. If the Neighbor A is learnt on port 2/2 the message will not be forwarded to A.

To solve this problem, switch A should learn Neighbor C on port 1/1 and vise versa (Switch C should learn neighbor A on port 2/1). Neighbors learned on the IST ports will therefore be mapped to the appropriate SMLT port. Once the source MAC of the message may be determined, the port for the source MAC (as determined via Address Resolution Protocol (ARP)) is determined, and the neighbor may be learned on the port associated with the source MAC. Neighbors learned in this manner are flagged as NBF_SMLT.

When the SMLT link between B and A goes down, the failure may be communicated to core switch C over the IST link. Triggered joins are sent by switch B to switch A. On switch C, the neighbor flag NBF_SMLT is reset. The switch C processes packets received on the multicast as if the SMLT does not exist. When the link comes back up, regular SMLT processing may resume.

As mentioned above JOIN-PRUNE, HELLO, and ASSERT messages which are received on an IST port from a SMLT neighbor should be processed as if the message was received on the SMLT port. The same method as mentioned above is used for mapping the ports of the received messages.

Figure 6:
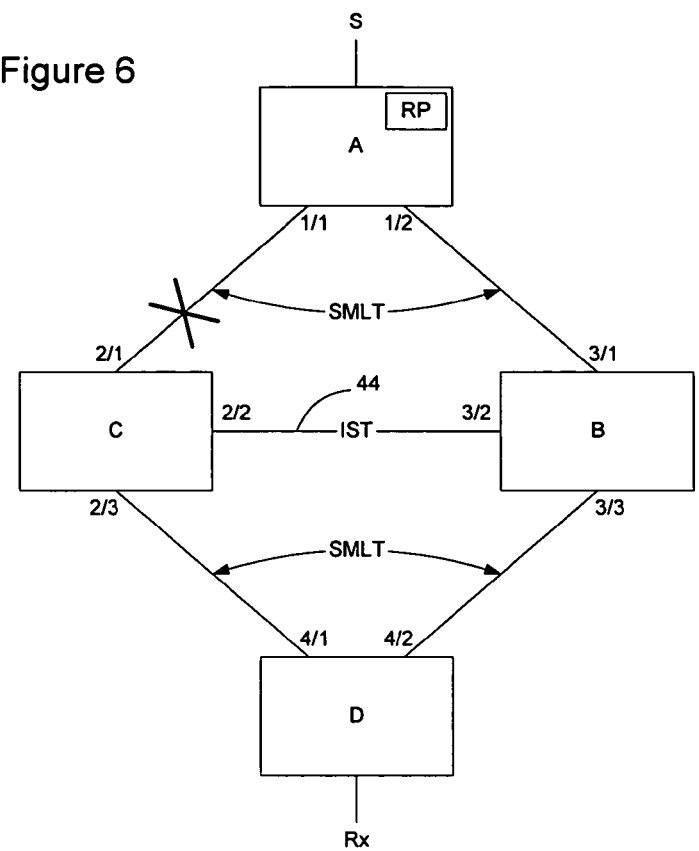

FIG. 6 illustrates an example in which a first SMLT is created between network element A and network elements B and C, and a second SMLT is created between the network elements B and C and network element D. In this example, it will be assumed that network element A is connected to a source networks and network element D is connected to a receiver R.

If the link between A and C goes down (SMLT_DOWN), triggered joins are sent by B once the PEER SMLT goes down. On switch C, if the RPF port was pointing to 2/1, the RPF port is changed to IST port 2/2 to prevent the source group entries from getting deleted. Since the link between A and C is down, all of the neighbors that were flagged as NBF_SMLT will be reset so that they may be learned on the IST link. This allows processing of the packets as if the SMLT didn't exist.

When the link between A and C comes back up (SMLT_UP), triggered joins will be sent and HELLO messages will be sent on the SMLT interface so that the neighbors are able to be flagged as NBF_SMLT once again. This allows the messages associated with the neighbors to be mapped to the SMLT port rather than the IST port. The forwarding of packets from the IST to SMLT port will once again be prohibited.

Assuming that a link between C and D is down, switch C will need to receive a JOIN message from switch D when the link between C and D comes up. Switch D, however, is unaware that a transition is occurring since it is operating under normal MultiLink Trunking (MLT) mode and does not know that the trunks terminate at more than one switch. Normally, switch D will send a JOIN message once its JOIN-PRUNE timer expires. To enable SMLT to recover more quickly, once the PEER SMLT comes up (Switch C in this example), a HELLO message will be sent on the SMLT interface (interface 2/3) with the reserved bit set to 1 in the PIM header. Upon receipt of a HELLO message with the reserved bit set to 1, switch D will send out triggered joins. In this manner, Switch D may be forced to send out a new triggered join to re-establish the path over the link between C and D.

If Switch C goes down, switch B will determine that switch C is down by the IST link going down. In this case, triggered joins will be sent, and neighbors which are flagged as NBF_SMLT are unflagged. This allows processing within network element B to occur as though SMLT never existed.

When switch C comes back up, the IST link between B and C will come back up. A temporary default route will then be added to the routing table which will expire after a short period of time, for example 60 seconds. The switch that didn't experience failure (Switch B in this example) will send a HELLO message to the switch that just came back up (Switch C in this example) and then send Rendezvous Point and BootStrap Router information to switch C. The default route enables the RP and BSR information to be added to Switch C.

Switch B will also send HELLO messages on the SMLT interfaces (3/1 and 3/3) with the reserved bit set to 1 in the PIM header to cause the neighboring network elements to issue triggered JOIN messages. When switch D receives a HELLO message with the reserved bit set to 1, it sends out a HELLO message and then sends out triggered JOIN messages. Depending on the timing of the various messages, it may be possible for a triggered JOIN to be sent before the network C has had time to map the ARP for switch D's source MAC address to the appropriate SMLT port, or before the network C has had time to learn the rendezvous point. Accordingly, the switch D may be configured to send triggered JOIN messages multiple times, for example every 5 seconds for 5 times, so that fast recovery may be ensured.

Traffic in a PIM multicast depends on the unicast routing tables in the switches. Accordingly, traffic on the multicast will not recover until switch C learns a route to the source and a route to the rendezvous point. To ensure fast recovery, it may be possible to configure static routes on switch C, although the invention is not limited in this regard as other ways of learning these routes on an expedited basis may be used as well.

Square SMLT Set Up

FIG. 7 illustrates a square SMLT setup in which network elements A and B are peer SMLT switches joined by IST 44, and network elements C and D are peer SMLT switches joined by IST 46. When the Hello messages are received then the source Mac address is taken from the L2 header and the port for the source Mac (as determined via ARP) is determined and the neighbor is learnt on the port associated with the source Mac. The neighbors learned on the IST port are mapped to appropriate SMLT port. In FIG. 8, A is neighbor with D on SMLT port 1/1, and is a neighbor with B on IST port 1/2. B is a neighbor with A on IST port 3/1 and with C on SMLT port 3/2. D is a neighbor with A on SMLT port 2/1 and with C on IST port 2/2. C is a neighbor with B on SMLT port 4/1 and with D on IST port 4/2. In the example illustrated in FIG. 8, the source is connected to switch A and the receiver is connected to switch C. Switch B has been designated as the rendezvous point in this example.

To allow multicast to operate in this square architecture, multicast software forwarding must be enabled on all the switches so that the first packet that comes via the RP to switch C is the one that will create the SG entry at C, which will in turn create SG join to the source S.

When a packet is received by Switch A, it will be sent to the RP on switch B and broadcast to all ports, including SMLT port 3/2. Thus, the first packet of the multicast will be forwarded over link 3/2 to switch C and will be received by switch C on port 4/1. If the traffic rate is high, by the time the hardware record is created, the packets are also received by C on IST port 4/2. If there is a receiver on Switch D also port 4/2 would be in the outgoing interface list on switch C. The receipt of two copies of the packet, one on outgoing interface of switch C, will cause an ASSERT to be sent. To avoid this, the switch C may be configured to not send an ASSERT if the input interface is towards the SMLT port and the packets arrive on the IST port. A reason for preventing an ASSERT in this situation is that, although the first packet of the multicast was forwarded by switch B on SMLT port 3/2, the rest of the packets will be blocked at switch B since after the initial packet switch B will identify the packets as arriving on an IST port and being destined for an SMLT port. As described above, under normal operating conditions, a switch will not forward packets from an IST port to an SMLT port on the same VLAN. Thus, an ASSERT is not required as the duplicative traffic will naturally cease since the hardware architecture prevents B from continuing to send additional packets over the SMLT port.

If switch D goes down, it will be necessary to use port 1/2 on A as an egress port for traffic on the multicast. This requires B to unset the SMLT flags on port 3/2 and requires C to issue a triggered JOIN message so that traffic may be transmitted by B en route from A to C (A→B→C). Causing C to issue a triggered JOIN message enables fast recovery of the traffic by causing the new path to be more quickly established through B. Without issuance of a triggered JOIN, recovery will be delayed until the next normal JOIN/PRUNE occurs.

When switch D comes up, triggered JOIN messages are again sent to A so that the egress interface may be re-mapped to the SMLT port 1/1 on A. The description set forth above with respect to triangular SMLT for LINK UP/LINK DOWN, PEER IST UP/PEER IST DOWN also apply to the square SMLT architecture.

FIG. 8 illustrates a square mesh SMLT architecture which is substantially similar to the architecture illustrated in FIG. 7, with the exception that A and C are now neighbors via cross links on ports 1/3 and 4/3, and B and D are now neighbors via cross link ports 3/3 and 2/3. Assume, for this example, that the smallest port is on cross-link (1/3). When SG JOINS are sent towards A, D will process the JOIN messages and send out a JOIN to A. A will also receive the JOIN message via B on the IST and map it to the lowest port on cross link (1/3). So, A will have ports 1/3 and 1/1 in its egress list and will send out traffic on both, which will cause traffic to be duplicated. To avoid this, one of the ports may be elected to forward the traffic while the other port may be stopped. For example, the switch A may be configured so that the smallest port is directed toward the SMLT links, rather than on the cross links. This will allow the smallest port to forward traffic which, accordingly, will cause the traffic to traverse the SMLT links rather than the cross links. Triggered updates may be used for fast recovery of traffic when D goes down or comes up as described in greater detail above.

From a management perspective, it is important to provide management and troubleshooting tools. Specifically, to allow management to occur, it is useful to allow the path of a given multicast route in SMLT to be traced. This function can be based on existing functionality like the show multicast route hardware functionality, but it has to have some specific SMLT information like the SMLT ID and the information about the neighbor on the edge (locally learned or through the IST form the peer with MRLP). The invention is not limited to any particular manner of implementing the management aspects of enabling multicast over SMLT.

Figure 9:
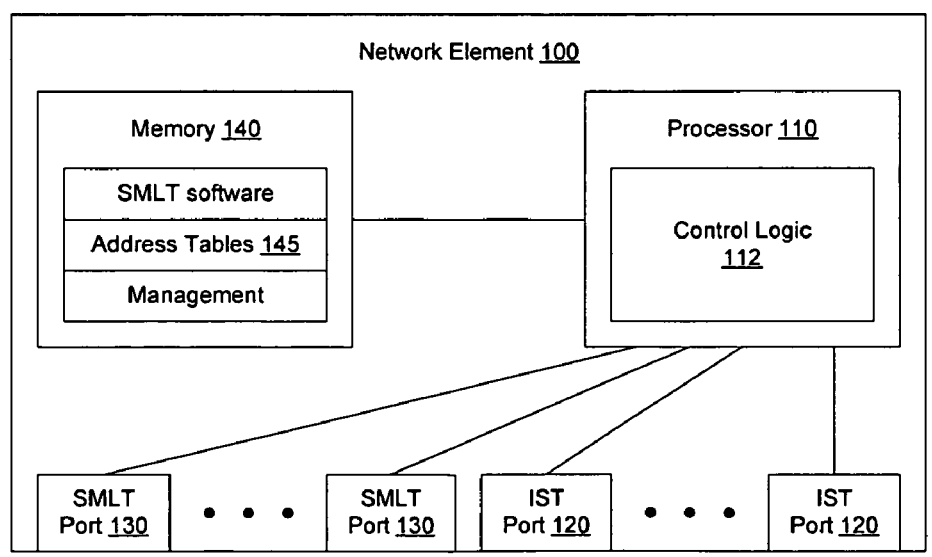
FIG. 9 is a functional block diagram of a network element configured to implement multicast over SMLT according to an embodiment of the invention.

FIG. 9 is a block diagram showing the relevant components of an example network element 100 that may be used to implement one of the SMLT switches to allow multicast to occur over the SMLT in accordance with an embodiment of the invention. The network element 100 includes a control processor 110 configured to execute control logic 112, IST ports 120, and SMLT ports 130. Other conventional ports may be included as well, and the invention is not limited to a network element having only the particular illustrated types of ports. A memory 140 configured to contain data and instructions for execution on control processor 110 may be provided internal to or interfaced with the network element.

The control logic 112k may be configured to enable the network element 100 to communicate with the edge devices over the split multilink trunk via the SMLT ports 130 and to communicate with other SMLT network elements over IST ports 120. The control logic may also be configured to enable the network element 100 to function as describe din greater detail above to enable multicast to occur over a SMLT network architecture. The network element may also contain other components, such as a memory 140 containing an address table holding address information for use by the network element 100.

The network element 100 works in conjunction with the peer network elements so that the collection of network elements appear to the edge device as a single device coupled to the edge device through the SMLT.

It should be understood that all functional statements made herein describing the functions to be performed by the methods of the invention may be performed by software programs implemented utilizing subroutines and other programming techniques known to those of ordinary skill in the art. For example, the functions described herein may be implemented in control logic 112 and executed on control processor 110. Alternatively, these functions may be implemented in hardware, firmware, or a combination of hardware, software, and firmware. The invention is thus not limited to a particular implementation.

Although one or more embodiments of the invention have been described herein, the invention is not limited to the particular examples as many other features may be implemented in addition to those described above. For example, in addition to configuring the core switches to exchange PIM-SM messages, it may be possible to extend the PIM-SM protocol to enable the core switches to provide redundant load-shared RP functionality. Specifically, the RPs would be configured on multiple switches' circuitless-ip-interfaces, with the same IP address (Anycast) which would be injected into the Internet Group Protocol (IGP). All switches would then be configured to use this Anycast IP for the same multicast groups using static-rp. The invention is thus not limited to a network element that implements only the particular described functions as many additional functions may be performed by the network element.

The controller may be embodied as a software program implemented in control logic 112 on a processor on the network element 100 or may be configured as a FPGA or other processing unit on the network element. The control logic in this embodiment may be implemented as a set of program instructions that are stored in a computer readable memory within the network element and executed on a microprocessor on the network element. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of enabling multicast routing over a Split MultiLink Trunk (SMLT) having multiple links and extending between a first network element and second and third network elements, said SMLT having a first SMLT link extending from the first network element to the second network element, and said SMLT having a second SMLT link extending from the first network element to the third network element, the method comprising the steps of:
   receiving, by the second network element, a multicast routing protocol control message over the first SMLT link;
   transmitting, by the second network element, the multicast routing protocol control message over an Inter-Switch Trunk (IST) extending between the second network element and third network element;
   receiving, by the third network element, the multicast routing protocol control message on the IST;
   determining, by the third network element, whether the multicast routing protocol control message is associated with the first network element;
   processing, by the third network element, the multicast routing protocol control message as if it had been received over a port assigned to the second SMLT link if it is determined that the multicast routing protocol control message is associated with the first network element;
   receiving, by the third network element, multicast data traffic associated with a Virtual Local Area Network (VLAN) on the IST;
   determining whether the multicast data traffic is to be forwarded over a SMLT link; and
   not forwarding the traffic over the SMLT link if the SMLT link is associated with the VLAN; and
   forwarding the traffic over the SMLT link if the SMLT link is not associated with the VLAN, to thereby use the IST to enable multicast data traffic to be routed between VLANs.

2. The method of claim 1, wherein the step of determining, by the third network element, comprises performing a source MAC address lookup on the multicast routing protocol control message.

3. The method of claim 1, wherein the SMLT is a square SMLT network architecture further comprising a fourth network element interposed on the first SMLT link between the first and second network elements.

4. The method of claim 1, wherein the SMLT is a meshed square SMLT network architecture further comprising a fourth network element interposed on the first SMLT link between the first and second network elements, said meshed square SMLT network architecture including a first cross link extending between the first and second network elements and a second cross link extending between the third and fourth network elements.

5. The method of claim 4, further comprising the step of:
   selecting between the first SMLT link and the first cross link to enable either the first SMLT link or the first cross-link to transmit multicast traffic between the first network element and the second network element but not both, wherein the first SMLT link is preferentially selected over the first cross link.

6. The method of claim 1, wherein the multicast routing protocol control message is a Distance Vector Multicast Routing Protocol (DVMRP) message.

7. The method of claim 1, wherein the multicast routing protocol control message is a Protocol Independent Multicast (PIM) message.

8. The method of claim 1, further comprising causing the first network element to transmit a triggered join message upon recovery from a failure of at least one of the first network element and second network element, to cause fast reestablishment of the multicast on the SMLT.

9. A network element configured to implement a Split Multi-Link Trunk (SMLT) with a second network element, said SMLT including multiple links at least a first of which is to be connected to the network element and at least a second of which is to be connected to the second network element, the network element comprising:
   a processor containing control logic configured to:
      receive a first multicast routing protocol control messages over a first port assigned to the SMLT, and to transmit the first multicast routing protocol control message to the second network element over a second port assigned to an Inter-Switch Trunk (IST);
      receive a second multicast routing protocol control message over the second port assigned to the IST, determine whether the second multicast routing protocol control message is associated with a network element associated with the SMLT, and process the second multicast routing protocol control message as if it were received over the first port assigned to the SMLT if it is determined that the second multicast routing protocol control message is associated with the SMLT;
      receive, by the first network element, multicast data traffic associated with a Virtual Local Area Network (VLAN) on the second port assigned to the IST;
      determine whether the multicast data traffic is to be forwarded over a SMLT link;
      not forward the traffic over the SMLT link if the SMLT link is associated with the VLAN; and
      forward the traffic over the SMLT link if the SMLT link is not associated with the VLAN, to thereby use the IST to enable multicast data traffic to be routed between VLANs.

10. The network element of claim 9, wherein the control logic is configured to determine whether the second multicast routing protocol control message is associated with a network element associated with the SMLT by performing a source MAC address lookup on the multicast routing protocol control message.

11. A first network element configured to implement a Split Multi-Link Trunk (SMLT) with a second network element, the SMLT including at least two links, a first of said links extending between the first network element and a third network element and a second of said links extending between the second network element and the third network element, the first network element comprising:
   at least a first port assigned to the first SMLT link extending between the first network element and the third network element;
   a second port assigned to an Inter-Switch Trunk (IST) link extending between the first and second network elements; and
   a processor containing control logic configured to:
      receive a first multicast routing protocol control message over the first port assigned to the first SMLT link;
      transmit the first multicast routing protocol control message to the second network element over the second port assigned to the IST link;
      receive, by the first network element, multicast data traffic associated with a Virtual Local Area Network (VLAN) on the second port assigned to the IST;

determine whether the multicast data traffic is to be forwarded over a SMLT link;

not forward the traffic over the SMLT link if the SMLT link is associated with the VLAN; and forward the traffic over the SMLT link if the SMLT link is not associated with the VLAN, to thereby use the IST to enable multicast data traffic to be routed between VLANs.

12. The network element of claim 11, wherein the processor further contains control logic configured to receive a second multicast routing protocol control message over the second port assigned to the IST link, determine whether the second multicast routing protocol control message is associated with the SMLT by determining if the second multicast routing protocol control message is associated with at least one of the third network element and another network element reachable over the SMLT link, and process the second multicast routing protocol control message as if it were associated with the first port assigned to the SMLT link rather than the IST link if it is determined that the second multicast routing protocol control message is associated the SMLT.

13. The network element of claim 12, wherein the control logic is further configured to determine whether the second multicast routing protocol control message is associated with the SMLT by performing a source MAC address lookup on the second multicast routing protocol control message.

14. The network element of claim 11, wherein the SMLT is formed as a square SMLT network architecture further comprising a fourth network element interposed on the first SMLT link between the first and third network elements.

15. The network element of claim 11, wherein the SMLT is a meshed square SMLT network architecture further comprising a fourth network element interposed on the first SMLT link between the first and third network elements, said meshed square SMLT network architecture including a first cross link extending between the first and third network elements and a second cross link extending between the second and fourth network elements.

16. The network element of claim 15, wherein the first network element further comprises a third cross link port assigned to the first cross link, and wherein the control logic is configured to select between the first SMLT link and the first cross link for transmission of multicast traffic between the first network element and the third network element, wherein the first SMLT link is preferentially selected over the first cross link.

17. The network element of claim 11, wherein the multicast routing protocol control message is a Distance Vector Multicast Routing Protocol (DVMRP) message.

18. The network element of claim 11, wherein the multicast routing protocol control message is a Protocol Independent Multicast (PIM) message.

19. A system, comprising:
a first network element;
a second network element;
an Inter Switch Trunk (IST) connecting the first network element with the second network element;
a third network element;
a Split MultiLink Trunk (SMLT) interconnecting the third network element with both the first and second network elements;
wherein the first and second network elements are configured to exchange multicast routing protocol control messages over the IST to enable multicast over the SMLT;
wherein the first and second network elements are further configured to receive multicast data traffic associated with a Virtual Local Area Network (VLAN) over the IST, determine whether the multicast data traffic is to be forwarded over the SMLT, not forward the traffic over the SMLT if the SMLT is associated with the VLAN, and forward the traffic over the SMLT if the SMLT is not associated with the VLAN, to thereby use the IST to enable multicast data traffic to be routed between VLANs.

* * * * *